United States Patent [19]
Hatakeyama

[11] Patent Number: 5,517,351
[45] Date of Patent: May 14, 1996

[54] OPTICAL RECEIVER APPARATUS

[75] Inventor: Shin Hatakeyama, Tokyo, Japan

[73] Assignee: NEC Corporation, Tokyo, Japan

[21] Appl. No.: 421,601

[22] Filed: Apr. 13, 1995

[30] Foreign Application Priority Data

Apr. 26, 1994 [JP] Japan .................................. 6-088135
Jul. 6, 1994 [JP] Japan .................................. 6-154484

[51] Int. Cl.$^6$ ...................................................... H01S 3/00
[52] U.S. Cl. ........................................... 359/341; 359/194
[58] Field of Search ................................ 359/341, 345, 359/337, 194; 385/2

[56] References Cited

U.S. PATENT DOCUMENTS 5,335,109  8/1994  Heidemann .............................. 359/341
5,467,219  11/1995  Ushirozawa ............................ 359/341

Primary Examiner—Mark Hellner
Attorney, Agent, or Firm—Young & Thompson

[57] ABSTRACT

Pumping light from a pumping laser diode is controlled by referring to both a peak value and a mark-space ratio value of an amplified signal. A peak value detecting circuit for the amplified signal light as well as a mark-space ratio detecting circuit for detecting the mark-space ratio are provided. The injection current to a semiconductor laser for pumping an erbium-doped optical fiber is controlled in accordance with a peak value when the mark-space ratio is in the vicinity of 0.5. When the mark-space ratio is beyond a predetermined range, for example 0.25 to 0.75, the injection current is fixed to a value obtained immediately before the mark-space ratio exceeds this range, to select the level fixing operation. Since the level fixing operation is carried out when the mark-space ratio is outside the predetermined range, the amplified signal light does not become excessive even when the mark-space ratio fluctuates. It thus becomes possible to prevent the detection failure of the received clock due to the breakdown of the receiving photodiode or optical noise.

22 Claims, 8 Drawing Sheets

OPTICAL RECEIVER APPARATUS

BACKGROUND OF THE INVENTION

1. Field of the Invention

The present invention relates to an optical receiving circuit for optical communication and, more particularly, to an optical receiving circuit provided with an optical fiber amplifier.

2. Description of Related Art

In conventional optical receiving circuits provided with an optical fiber amplifier, a pumping semiconductor laser is connected to an erbium-doped optical fiber through an optical multiplexer/branching filter to provide pumping light. A received light signal is amplified by the erbium-doped optical fiber.

The amplified output signal is converted into an electric signal by a photodetector through an optical band-pass filter. Furthermore, the electric signal is amplified by a pre-amplifier and a post-amplifier to be output as an equalizing amplified output signal.

In such arrangements, the receiving optical circuit must control amplification in the erbium-doped optical fiber, because of the detecting range of the photodiode. Amplification control is performed by controlling the injection current supplied to the pumping semiconductor laser. To decide an intensity of the injection current by feedback from the amplified output signal, a part of the equalizing amplified output signal is branched to an input of a peak value detecting circuit where a peak value detection output signal is output therefrom. The detection output signal is inputted into an automatic gain control circuit to control a current value output from a driving circuit for driving the pumping semiconductor laser. The pumping semiconductor laser outputs pumping light by using an injection current supplied by the driving circuit. The automatic gain control circuit is provided to control the injection current from the driving circuit in response to the detection output signal.

The remaining part of the equalizing amplified output signal is output from the optical receiving circuit as a data output signal discrimination and reproduced in a discriminator from a clock output signal extracted by a timing extracting circuit.

In the conventional optical receiving circuit provided with the optical fiber amplifier, the automatic gain control operation is carried out such that the peak value detection output signal has a constant value, and the gain control uses only this peak value detecting signal. Therefore, the automatic gain control characteristic depends on a mark-space ratio, because the mark-space ratio may change independent of the peak value. As a result, there is a problem that the light level of the input light from the optical fiber for amplification to the photodiode for receiving is varied when the mark-space ratio fluctuates. As used herein, it will be understood that the term "mark-space ratio" refers to the ratio of signal pulse width to the signal period including not only a signal pulse but also a following interval. Thus, when the pulses and intervals are of equal width, the mark-space ratio will be 0.5.

In particular, the underestimation of the light level by the mark-space ratio fluctuation may lead to an excessive application of the injection current to the pumping semiconductor laser. In the worst case, it may happen that the received clock cannot be detected due to the breakdown of the photodiode for receiving or the increase of the optical noise caused by the excessive input light.

SUMMARY OF THE INVENTION

In view of the above-described drawbacks, an object of the present invention is to provide an optical receiving circuit in which the appropriate injection current is applied to a pumping semiconductor laser. The object of the present invention is that the injection current would be free of influence from the fluctuation of the mark-space ratio without causing the breakdown of a photodiode for receiving or the optical noise.

To achieve this aim, an optical receiving circuit according to the present invention comprises an automatic gain control/level fixation circuit which supplies the injection current to a pumping semiconductor laser for induction in connection with a peak value detection output signal and a mark-space ratio detection output signal, in addition to a mark-space ratio detecting circuit.

In particular, the optical receiving circuit of the present invention is characterized in that an amplified signal light is controlled by a value of a peak value detection output when the value of a mark-space ratio detection output is within a predetermined range. The same is controlled by a value independent of the peak value detection output when a value of the mark-space ratio detection output is outside the predetermined range.

The optical receiving circuit of the present invention is further characterized in that a control circuit sets a control signal would be fixed before the value of the mark-space ratio exceeds a predetermined value, when the mark-space ratio detection output is beyond a predetermined range and becomes larger than the predetermined value. In result, a mean value of output levels of the amplified signal light becomes constant by fixing an injection current to a value obtained immediately.

The present invention is provided with a mark-space ratio detecting circuit in parallel with a peak value detecting circuit, and the gain control makes reference to both a peak value and a mean value of equalizing amplified output signals. Therefore, the present invention is capable of setting the injection current to a pumping semiconductor laser independently of the peak value when the mean value deviates too greatly from 0.5, thereby enabling stable operation with no influence due to the mark-space ratio fluctuation. In particular, the injection current to the pumping semiconductor laser becomes constant when the mark-space ratio exceeds a predetermined value. This prevents breakdown of a receiving photodiode or generation of optical noise caused by excessive input light.

BRIEF DESCRIPTION OF THE DRAWINGS

The above and other objects, features and advantages of the present invention will become more apparent from the following detailed description when taken in conjunction with the accompanying drawings, wherein.

DETAILED DESCRIPTION OF THE PREFERRED EMBODIMENTS

To begin with, to easily understand the present invention, a conventional optical receiving circuit will be described.

Figure 1:
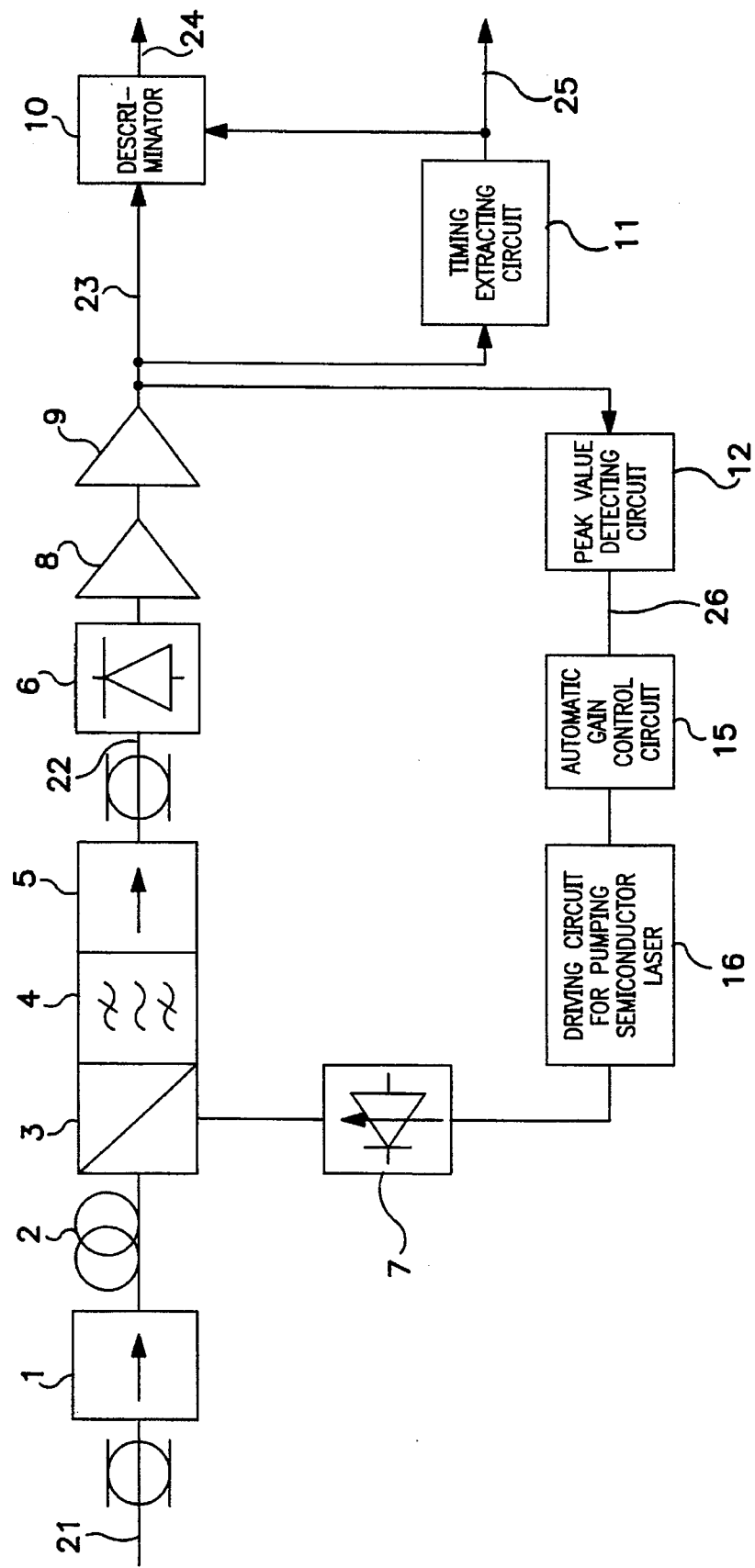
FIG. 1 is a block diagram showing an example of a prior art optical receiving circuit.

FIG. 1 shows an example of a conventional optical receiving circuit provided with an optical fiber amplifier. In the prior art optical receiving circuit, as shown in FIG. 1, an erbium-doped optical fiber 2 for amplifying an input signal light 21 is connected to a pumping semiconductor laser 7 at the output of the erbium-doped optical fiber 2. The pumping light from the pumping semiconductor laser 7 is incident on the erbium-doped optical fiber 2 through an optical multiplexer/branching filter 3. An optical isolator 1 is provided at the input side of the erbium-doped optical fiber 2 in order to prevent reversal of the incident light.

An amplified output signal 22 amplified by the erbium-doped optical fiber 2 is converted into an electric signal by a receiving photodetector 6 after first passing though the optical band-pass filter 4 and further optical isolator 5. The signal is amplified by a pre-amplifier 8 and a post-amplifier 9 to be output as an equalizing amplified output signal 23. A part of the equalizing amplified output signal 23 is branched to an input of a peak value detecting circuit 12 from which a peak value detection output signal 26 is input to an automatic gain control circuit 15 to control a current value output from a driving circuit 16.

The remaining part of the equalizing amplified output signal 23 is output from the optical receiving circuit as a data output signal 24. Signal 24 is discriminated and reproduced in a discriminator 10 using a clock output signal 25 extracted by a timing extracting circuit 11.

The pumping semiconductor laser 7 outputs pumping light by using an injection current supplied by the driving circuit 16. In the driving circuit 16, a controlling output signal from an automatic gain control (AGC) circuit 15 is input and an injection current value to be applied to the pumping semiconductor laser 7 is then set.

An automatic gain control operation using the conventional optical fiber amplifier will now be described. The equalizing amplified output signal 23 is input to the peak value detecting circuit 12. A peak value detection output signal 26 according to an output amplification of the equalizing amplified output signal 23 is output to the automatic gain control circuit 15. The automatic gain control feedback circuit is thus constituted by the pumping semiconductor laser 7, the receiving photodiode 6, the pre-amplifier 8, the post-amplifier 9, the peak value detecting circuit 12 and the automatic gain control circuit 15. The automatic gain control operation is performed in such a manner that the peak value detection output signal 26 maintains a constant value.

In the conventional optical receiving circuit, the peak value detection output signal has a constant value by using only this peak value detection signal. However, it has now been recognized that the automatic gain control characteristic depends on the mark-space ratio. Therefore, the light level of the input light output from the optical fiber for amplification to the photodiode varies by the mark-space ratio fluctuations.

When the mark-space ratio value is near 0.5, the light changes do not influence the peak value detecting circuit 12 and the photodiode 6. The underestimation of the light level owing to the mark-space ratio fluctuation, however, may lead to an excessive application of injection current to the pumping semiconductor laser 7. As a result, excessive input light from the pumping semiconductor laser may break the photodiode 6, and also the received clock cannot be detected due to an increase in the optical noise.

Figure 2:
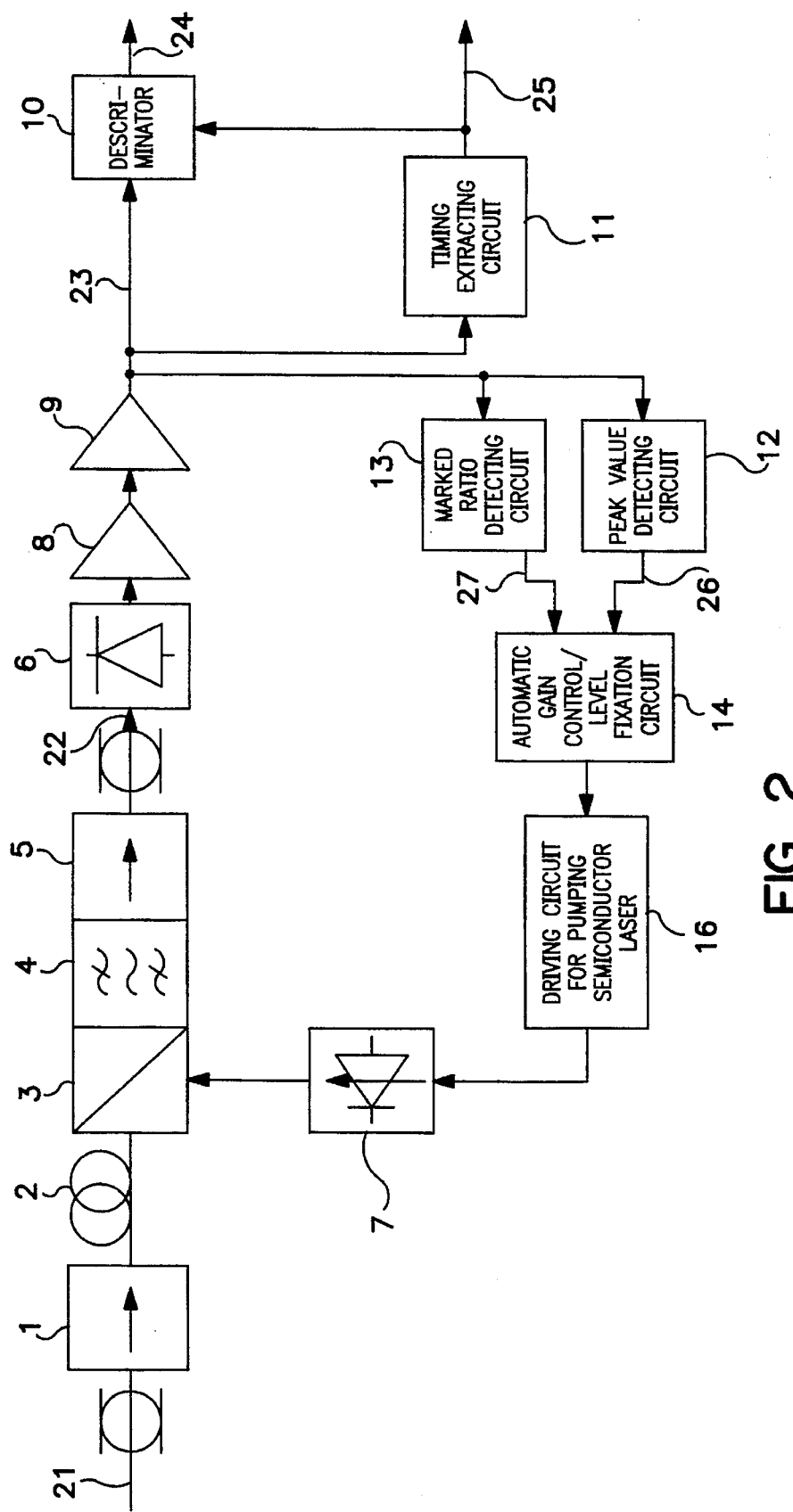
FIG. 2 is a block diagram showing a first embodiment of an optical receiving circuit according to the present invention.

Now, the optical receiving circuit according to the present invention will be described. FIG. 2 is a block diagram showing the first embodiment of an optical receiving circuit of the invention. The difference from the block diagram of FIG. 1 showing the prior art is that a part of a branched equalizing amplified output 23 is input both to a peak value detecting circuit 12 and to a mark-space ratio detecting circuit 13 provided in parallel with the circuit 12. Also, both the peak value detection output 26 and the mark-space ratio detection output 27 are input to a control circuit as shown in FIG. 2.

An additional difference from the prior art, is that the control circuit provided in the present invention is constituted by an automatic gain control/level fixation circuit 14. This control circuit 14 performs not only a function of carrying out automatic gain control but also a function of fixing the level of the control signal, based on the input mark-space ratio value detected by the mark-space ratio detecting circuit 13.

Firstly, a description will be given of the level fixing operation in the automatic gain control/level fixation circuit 14. With an output signal 26 from the mark-space ratio detection circuit 13 which receives an equalizing amplified output signal 23, the automatic gain control/level fixation circuit 14 selects either automatic gain control or the setting of the injection current to the pumping semiconductor laser 7 to have a fixed value.

Figure 3:
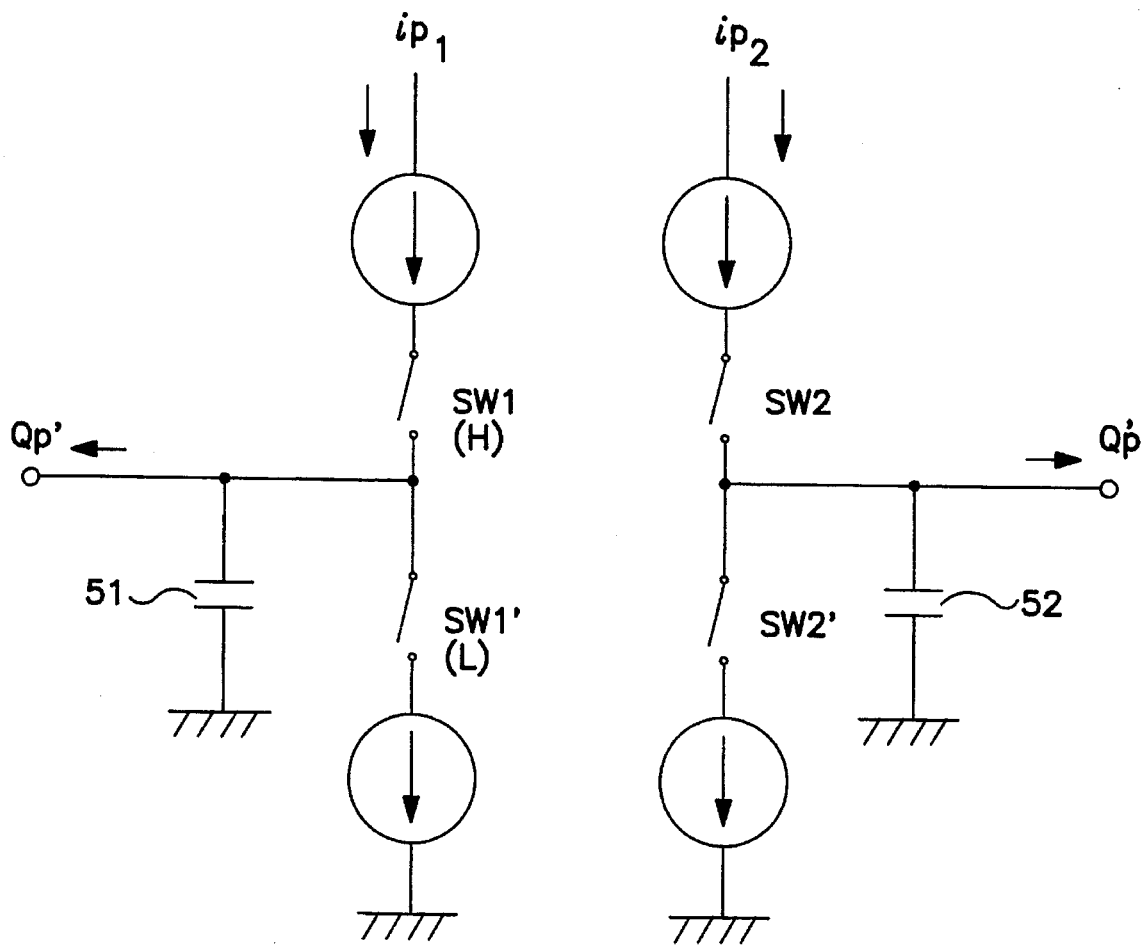
FIG. 3 shows an example of a mark-space ratio detecting circuit used in the optical receiving circuit of the present invention.

FIG. 3 shows an example of the mark-space ratio detecting circuit 13 used in the optical receiving circuit of the present invention. This circuit 13 has switches SW1 and SW1' and switches SW2 and SW2' connected in series, respectively, and capacitors 51 and 52 as shown in FIG. 3. The switches SW1 and SW1' are closed at high and low levels of the input current, respectively. The switches SW2 and SW2' function the same as the switches SW1 and SW1'.

Figure 4:
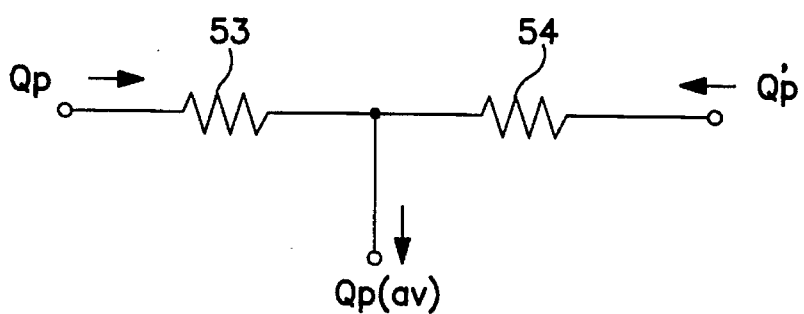
FIG. 4 shows an example of a circuit determining a mark-space ratio by voltage response to receiving status detected by the circuit shown in FIG. 3, and generating a control signal.

The mark-space ratio detecting circuit 13 receives an output current ip1 and ip2 in response to receiving pulses from the post-amplifier 9. When the current ip1 is high status, the switch SW1 is closed and the switch SW1' is opened, and the current causes charging of the capacitor 51. On the contrary, when the current ip1 is low, the switch SW1 is opened and the switch SW1' is closed, and capacitor 51 is discharged. As a result, a voltage Qp is given in response to the high status length of the received signal pulses. Also, the current ip2 which is reverse to the current ip1 is input to the switch SW2. A voltage Qp' is given in the same way. In this embodiment of the present invention, transistors (not shown) are used as the switches SW1–SW2'. A voltage Qav which corresponds to the mark-space ratio of the received signal pulses, is finally given by averaging the voltages Qp and Qp' by using the circuit as shown in FIG. 4. The detected mark-space ratio signal 27 is output to the automatic control/level fixation circuit 14 on the basis of the voltage Qav.

Figure 5:
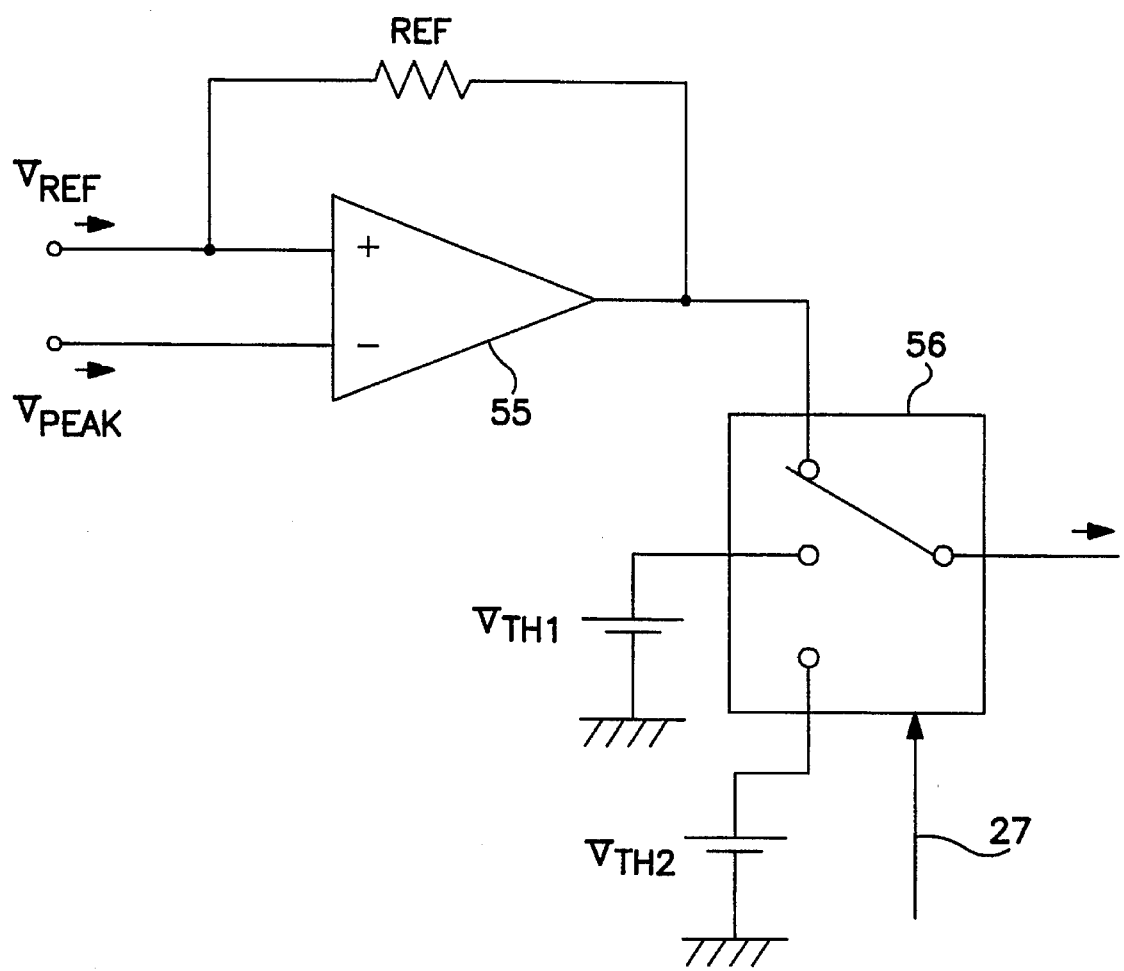
FIG. 5 shows an example of the automatic gain control/ level fixing circuit according to the present invention.

FIG. 5 shows an example of the automatic gain control/level fixing circuit according to the present invention. A voltage Vpeak corresponds to a peak value of the received signal pulses detected by the peak value detecting circuit 12. The voltage Vpeak is input to differential amplifier 55 with a reference voltage Vref. An output voltage from the differential amplifier 55 is input to a comparison and switching unit 56.

When the mark-space ratio is within the predetermined range, the output voltage from differential amplifier 55 is output to the driving circuit 16 as a control signal. As mentioned above, however, when the mark-space ratio output signal 27 is outside that range, the control signal from circuit 14 is converted into a voltage predetermined at a constant value Vth1 or Vth2.

Figure 6:
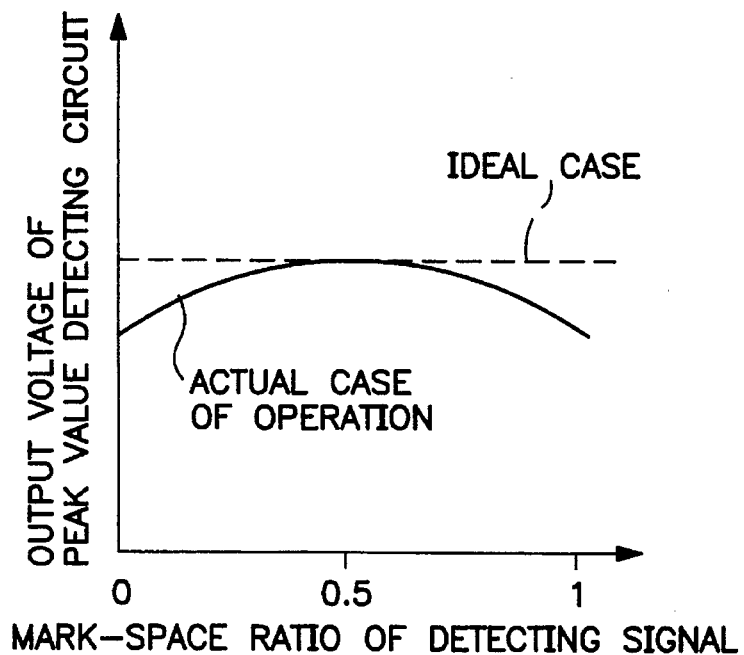
FIG. 6 is a graph showing the operation of a peak value detecting circuit.

The relationship between the circuit operation and the mark-space ratio of the received signal light 21 will now be explained. FIG. 6 shows an example of the operation of the peak value detecting circuit 12. If the circuit were ideal, the output voltage of the peak value detecting circuit would have a fixed value independent of the mark-space ratio as shown by the broken line. On the contrary, when the mark-space ratio is low (or high) in the actual circuit, since the rectification effect is reduced, the output voltage of the peak value detecting circuit depends on the mark-space ratio. Therefore, when the ratio is low (or high), the output voltage of the peak value detecting circuit becomes lower than the same obtained when the ratio is equal to 0.5.

Figure 7:
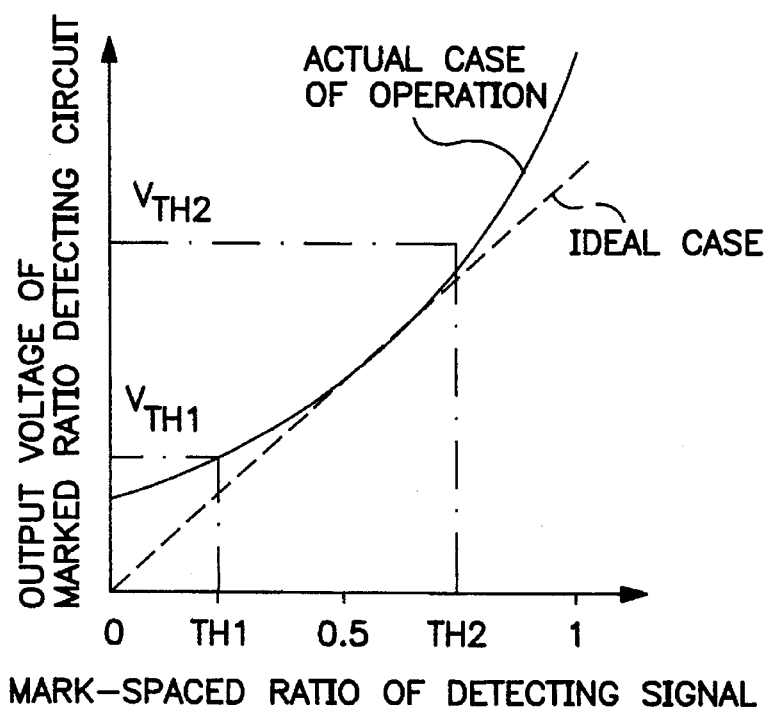
FIG. 7 is a graph showing the operation of a mark-space ratio detecting circuit.

FIG. 7 illustrates the operation of the mark-space ratio detecting circuit 13. If the circuit were ideal, the output voltage of the mark-space ratio detecting circuit would be linear with respect to the actual mark-space ratio, as shown by the broken line. On the contrary, when the mark-space ratio is low (or high) as in the actual circuit, however, the automatic gain control is caused to function so as to compensate the reduction in the rectification effect of the peak value detecting circuit 12. As a result, the input light level to the photodiode 6, i.e., the intensity of the amplified signal light 22 is increased. The output voltage of the mark-space ratio detecting circuit thus becomes larger than that obtained if the operation of the peak value detecting circuit were ideal, as shown by the solid line. Therefore, so long as the output voltage of the mark-space ratio detecting circuit 13 linearly increases (or decreases) with respect to the mark-space ratio, it is possible to detect the mark-space ratio by using this mark-space ratio detecting circuit.

Figure 8:
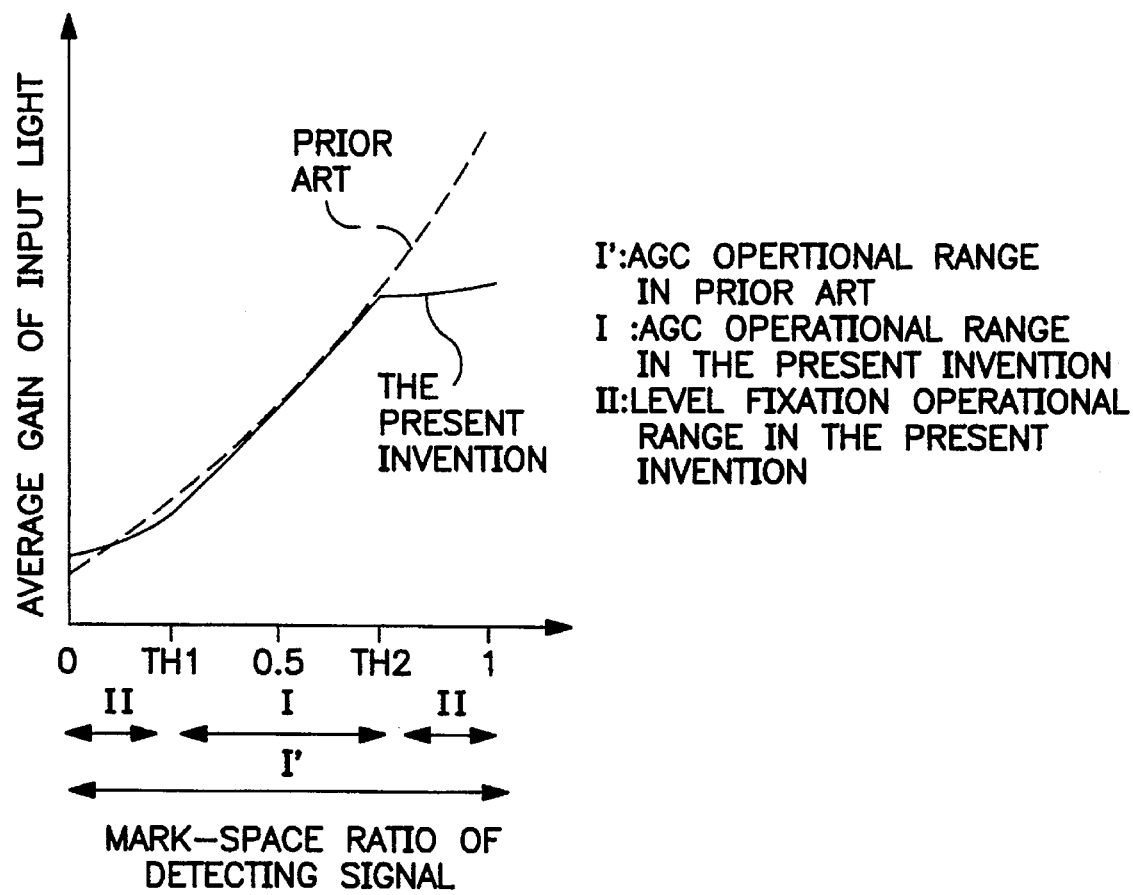
FIG. 8 shows an example of the automatic gain control/ level fixing operation of the second embodiment according to the present invention.

The relationship between the received signal light 21 and the mark-space ratio will now be described in comparison with the structural example of the prior art. FIG. 8 shows the input light levels of the amplified signal light 22 input to the photodiode in relation to the mark-space ratio of the received signal light 21. The broken line shows the operation of the structural example of the prior art, whereas the solid line represents the operation of the structural example of the present invention.

In the structural example of the prior art in which only the automatic gain control operation is carried out, the level of the output 26 from the peak value detecting circuit 12 decreases when the mark-space ratio of the input signal light 21 deviates from 0.5. Therefore, the gain of the optical fiber amplifier is increases because too much injection current is applied to the pumping semiconductor laser 7. As the ratio approaches "0" to "1", the input light level of the amplified signal light 22 input to the receiving photodiode 6 is increased.

In the invention, the automatic gain control operation is carried out only when the mark-space ratio is in the vicinity of 0.5. On the other hand, the level fixing operation is performed when the mark-space ratio is outside a predetermined range, i.e., when the mark-space ratio is in the vicinity of "0" to "1" (e.g., when the mark-space ratio is lower than TH1 or is higher than TH2 in FIGS. 7 and 8).

In the present embodiment, the range is determined to have specific values of 0.25 to 0.75. The intensity of pumping light may be generally set within this range by using only the value of the peak value detection output. It is preferable, however, to set the intensity of the pumping light in connection with the mark-space ratio when the mark-space ratio is within this range. Although the set range of the mark-space ratio is as described above in this embodiment, the set range is not restricted to these values. It is possible to vary the set range, provided that 0.5 is in the center.

Figure 9:
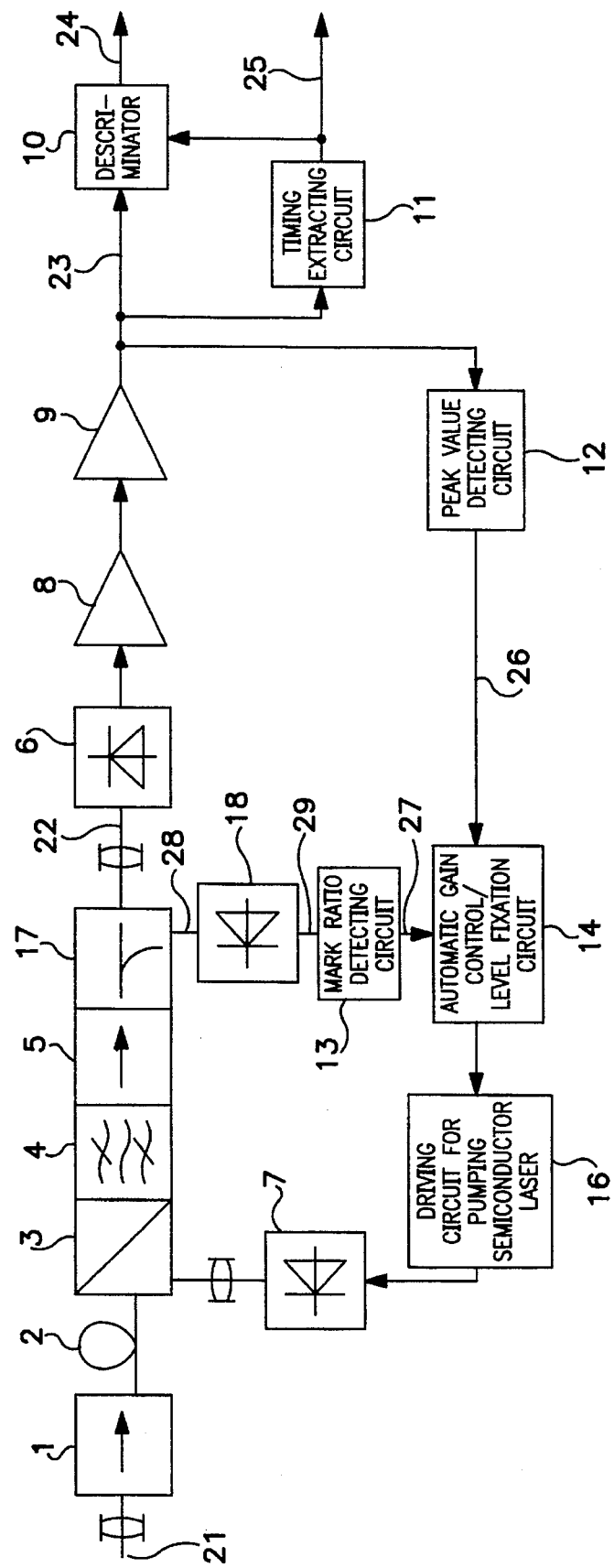
FIG. 9 is a block diagram showing a second embodiment of an optical receiving circuit according to the present invention.

The second embodiment of the present invention shown in FIG. 9 will be described. In comparison with the structure shown in FIG. 1, an optical brancher 17 is provided on the output side of optical isolator 5. Also, a receiver photodiode 18 is connected to the mark-space ratio detecting circuit 13 in the embodiment. A part of the received signal light which has been amplified is branched as reference input light 28 by the optical brancher 17. The reference input light 28 is input to the receiver photodiode 18 to be converted into reference electric signal 27 and input to the mark-space ratio detecting circuit 13. The mark-space ratio is detected in the mark-space ratio detecting circuit 13 in the same manner as in FIG. 2 and input to the automatic gain control/level fixation circuit 14. The operation of the automatic gain control/level fixation circuit is the same with that of the structure shown in FIG. 2.

The operation of this embodiment of the present invention will now be described. The amplified light output from the optical fiber for amplification 2 is partially branched by the optical brancher 17 and input to the photodiode 18 to be converted into the reference electric signal 29. The reference electric signal 29 is further input to the ratio detecting circuit 13. The mark-space ratio detection output 27 detected therein is input to the automatic gain control/level fixation circuit 14.

The pumping semiconductor laser 7, the automatic gain control/level fixation circuit 14 and the driving circuit 16 constitute a feed-back circuit and operate in such a way that the reference input light 28 has a fixed value.

Figure 10:
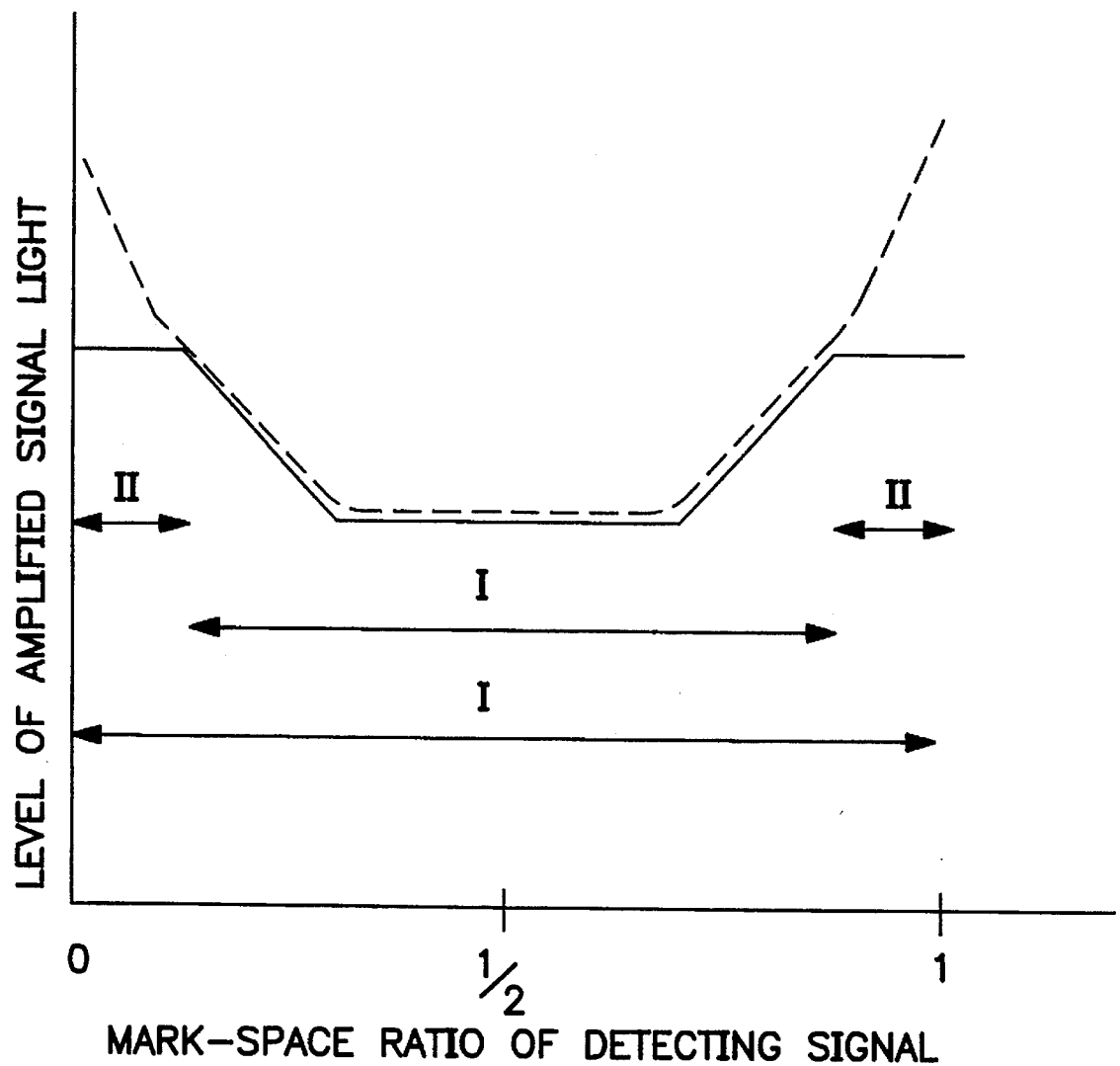
FIG. 10 shows an example of the automatic gain control/ level fixing operation used in the second embodiment.

FIG. 10 shows the levels of the received photodetector input light 22 with respect to the mark-space ratio of the received signal light 21 in the respective configurations of the prior art illustrated in FIG. 1 and the present invention. The solid line shows the operation of the structural example according to the present invention, while the broken line shows the operation of the structural example according to the prior art.

In the structural example according to the prior art, since the level of the peak value detection output 26 is decreased when the mark-space ratio of the received signal 21 deviates from 0.5, the gain of the optical fiber amplifier is increased because the automatic gain control operation is always carried out independent of the mark-space ratio.

On the other hand, in the configuration according to the present invention, the automatic gain control operation is carried out only when the marked ratio is in the vicinity of 0.5. On the contrary, the level fixing operation is performed when the mark-space ratio is outside a predetermined range and is in the vicinity of "0" or "1". As a result, the level of the received photodetector input light 22 is not excessively increased even when the ratio of the received signal light 21 gets near "0" or "1".

In the configuration of the first embodiment of the present invention, the mark-space ratio detection is effected by using the electric signal. Therefore, this embodiment is suitable for the integration of the entire configuration. In addition, it is advantageous in that high sensitivity can be maintained even when the receiving level of the light is low. The configuration of the second embodiment is advantageous in that post-amplification after the light is converted into the electric signal is not necessarily required and the mark-space ratio detection is enabled with fewer errors. Further, it is superior in the prevention of the saturation of the receiving photodetector or the protection of the same as compared with the first embodiment.

In both configurations, not only is the peak value detected, but also the mark-space ratio detecting circuit is provided in the feedback circuit to make reference to the mark-space ratio. The injection current to the pumping semiconductor laser can be kept stable without being affected by the mark-space ratio fluctuation. It is thus possible to effectively avoid the breakdown of the receiving photodiode or the generation of optical noise which may be caused when the input level of the amplified signal light to the photodiode is excessively increased.

Although, both of the described embodiments according to the present invention are examples in which the pumping light is incident on the outlet of the erbium-doped optical fiber 2, the same effect can be obtained even when the pumping light incident on the inlet end. In such a case, the erbium-doped optical fiber 2 is arranged in the rear of the optical multiplexer/branching filter 3.

Furthermore, when the mark-space ratio exceeds the predetermined range value, the automatic gain control/level fixation circuit 14 is capable of attenuating the injection current to the pumping semiconductor laser 7, instead of fixing it. Also, an appropriate injection current can be given by attenuating a current which is decided by peak value, in response to a difference between an actual detecting mark-space ratio and the center value of 0.5.

As described above, the optical receiving circuit of the present invention prevents the breakdown of the receiving photodiode due to excessive input light or the detection failure of the received clock due to an increase of optical noise even when the mark-space ratio of the equalizing amplified output signal fluctuates.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

I claim:

1. An optical receiving apparatus, comprising:
    amplifying means, which includes an optical fiber for light amplification and a pumping semiconductor laser diode which inputs pumping light to said optical fiber to amplify a received light signal and to output amplified light;
    converting means for converting said amplified light into an electric signal; and
    control means for outputting a control signal for controlling the output of said pumping light from said pumping semiconductor laser diode
    wherein said control means comprises means for setting said control signal based on a peak value of said electric signal and a mark-space ratio of said electric signal.

2. The optical receiving apparatus claimed in claim 1, wherein said control means sets said control signal with said peak value when said mark-space ratio is within a predetermined range and at a constant value when said mark-space ratio is outside said predetermined range.

3. The optical receiving apparatus claimed in claim 1, wherein said control means sets said control signal to reduce the output of said pumping light when said mark-space ratio varies from a value of 0.5 within said predetermined range.

4. An optical receiving apparatus, comprising:
    a pumping semiconductor laser which outputs pumping light;
    a driving circuit for driving said semiconductor laser by controlling injection current to said pumping semiconductor laser based on externally supplied control current;
    an optical fiber which receives said pumping light and amplifies an input signal light to output amplified signal light;
    a receiving photodiode for converting said amplified signal light into an equalizing output signal to be output therefrom;
    an amplifier for amplifying said equalizing output signal to output an equalizing amplified output signal;
    a peak value detecting circuit which receives a part of said equalizing amplified output signal and detects a peak value of said output signal to output a peak value detection output;
    a mark-space ratio detecting circuit which receives a part of said equalizing amplified output signal and detects a mean value of said output signal to output a mark-space ratio detection output; and
    a control circuit which receives said peak value detection output and said mark-space ratio detection output and controls said control current to said driving circuit.

5. The optical receiving apparatus claimed in claim 4, wherein said control current is controlled by a value of said peak value detection output when said mark-space ratio detection output is within a predetermined range; and
    wherein said control current is controlled by a value of said mark-space ratio detection output when said mark-space ratio is outside said predetermined range, thereby controlling said amplified signal light.

6. The optical receiving apparatus claimed in claim 5, wherein said control circuit sets said control signal such that a mean value of output levels of said amplified signal light becomes constant by fixing said injection current to a value obtained immediately before said mark-space ratio exceeds a predetermined range.

7. The optical receiving apparatus claimed in claim 6, wherein said predetermined range is a range extending from 0.25 to 0.75.

8. The optical receiving apparatus claimed in claim 4, wherein said injection current is set by attenuating a current determined by said peak value, in response to a difference between said mark-space ratio and a value of 0.5.

9. The optical receiving apparatus claimed in claim 4, wherein said optical fiber is an erbium-doped optical fiber.

10. The optical receiving apparatus claimed in claim 4, wherein optical multiplexers are provided upstream and downstream of said optical fiber.

11. The optical receiving apparatus claimed in claim 4, wherein an optical multiplexer is provided on an upstream side of said optical fiber.

12. An optical receiving apparatus, comprising:

a pumping semiconductor laser which outputs pumping light;

a driving circuit for driving said semiconductor laser by controlling injection current to said semiconductor laser based on externally supplied control current, an optical fiber which receives said induction light and amplifies an input signal light to output amplified signal light;

an optical brancher for branching a part of said amplified signal light to output branch amplified light;

a first receiving photodiode which converts said branched amplified light into a reference current to be output therefrom;

a second receiving photodiode for converting said amplified signal light into an equalizing output signal to be output therefrom;

an amplifier for amplifying said equalizing output signal to output an equalizing amplified output signal;

a peak value detecting circuit which receives said equalizing amplified output and detects a peak value of said output signal to output a peak value detection output;

a mark-space ratio detecting circuit which receives said reference current and detects a mean value of said reference current to output a mark-space ratio detection output; and a control circuit for receiving said peak value detection output and said mark-space ratio detection output to control said control current to said driving circuit.

13. The optical receiving apparatus claimed in claim 12, wherein said control current is controlled by a value of said peak value detection output when said mark-space ratio detection output is within a predetermined range, and wherein said control current is controlled by a value of said mark-space ratio detection output to control said amplified signal light when said mark-space ratio detection output is outside said predetermined range.

14. The optical receiving apparatus claimed in claim 13, wherein said control circuit sets said control signal such that a mean value of output levels of said amplified signal light to be constant by fixing said injection current to a value obtained immediately before said mark-space ratio departs from a predetermined range.

15. The optical receiving apparatus claimed in claim 14, wherein said predetermined range is a range exceeding from 0.25 to 0.75.

16. The optical receiving apparatus claimed in claim 14, wherein said optical fiber is an erbium-doped optical fiber.

17. The optical receiving apparatus claimed in claim 12, wherein optical multiplexers are provided upstream and downstream of said optical fiber.

18. The optical receiving apparatus claimed in claim 12, wherein an optical multiplexer is provided on an upstream side of said optical fiber.

19. The optical receiving apparatus claimed in claim 4, wherein said mark-space ratio detecting circuit comprises:

a first switch means, receiving said equalizing output signal as input at one end thereof, which closes when said equalizing output signal is in the high state and opens when the equalizing output signal is in the low state;

a second switch means, connected to the other end of said first switch means, which closes when said equalizing output signal is in the low state and opens when said equalizing output signal is in the high state;

a first capacitor having one end connected to connecting portions of said first switch means and said second switch means and the other end grounded; and an output portion for outputting a first electric charge to be charged in said first capacitor from said one end of said capacitor.

20. The optical receiving apparatus claimed in claim 19, wherein said mark-space ratio detecting circuit further comprises:

a third switch means, which receives an inverted equalizing output obtained by inverting said equalizing output signal, which closes when said inverted equalizing output is in the low state and opens when said inverted equalizing output is in the high state;

a fourth switch means, connected in series to said third switch means, which closes when said equalizing output signal is in the high state and opens when said equalizing output signal is in the low state;

a second capacitor having one end connected to connecting portions of said third switch means and said fourth switch means and the other end grounded; an output portion for outputting a second electric charge to be charged in said second capacitor from one end of said second capacitor; and an averaging circuit for outputting a mean charge of said first electric charge and said second electric charge.

21. The optical receiving apparatus claimed in claim 19, wherein said first switch means and said second switch means are transistors.

22. The optical receiving apparatus claimed in claim 20, wherein said third switch means and said fourth switch means are transistors.

* * * * *